United States Patent
Aldana

(10) Patent No.: US 7,916,807 B2
(45) Date of Patent: Mar. 29, 2011

(54) METHOD AND SYSTEM FOR CHOICE OF A STEERING MATRIX (Q) FOR SOUNDING IN ANTENNA SELECTION

(75) Inventor: Carlos Aldana, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 714 days.

(21) Appl. No.: 11/873,626

(22) Filed: Oct. 17, 2007

(65) Prior Publication Data

US 2008/0095268 A1 Apr. 24, 2008

Related U.S. Application Data

(60) Provisional application No. 60/829,989, filed on Oct. 18, 2006.

(51) Int. Cl.
*H04L 27/04* (2006.01)
(52) U.S. Cl. ........................................ 375/299
(58) Field of Classification Search .................. 375/299
See application file for complete search history.

(56) References Cited

U.S. PATENT DOCUMENTS

2008/0045153 A1* 2/2008 Surineni et al. .............. 455/63.1

OTHER PUBLICATIONS

IEEE P802.11n/D2.07, Sep. 2007, Draft STANDARD for Information Technology—Telecommunications and Information Exchange Between Systems—Local and Metropolitan Area Networks-Specific Requirements—Part 11: Wireless LAN Medium Access Control (MAC and Physical Layer (PHY) Specifications: Amendment 4 (#993): Enhancements for Higher Throughput, pp. 166-169, 239-241.

* cited by examiner

*Primary Examiner* — Kevin Y Kim
(74) *Attorney, Agent, or Firm* — McAndrews, Held & Malloy, Ltd.

(57) ABSTRACT

Aspects of a method and system for choice of a steering matrix (Q) for sounding in antenna selection are presented. Aspects of the system may include a transmitting station that enables determination of values for a plurality of matrix elements, which are represented in a steering matrix (Q). The contents of the steering matrix may be determined based on the contents of a plurality of protocol data units (PDU). Each of the PDUs may comprise a sounding frame. One or more space-time signals may be generated based on the plurality of PDUs. One or more transmit chain signals may be generated by multiplying a vector representation, which comprises the one or more space-time signals, by the steering matrix. One or more transmit chain signals may be transmitted via transmitting antennas selected from a plurality of transmitting antennas.

22 Claims, 7 Drawing Sheets

METHOD AND SYSTEM FOR CHOICE OF A STEERING MATRIX (Q) FOR SOUNDING IN ANTENNA SELECTION

CROSS-REFERENCE TO RELATED APPLICATIONS/INCORPORATION BY REFERENCE

This application makes reference, claims priority to, and claims the benefit of U.S. Application Ser. No. 60/829,989 filed Oct. 18, 2006, which is hereby incorporated herein by reference in its entirety.

FIELD OF THE INVENTION

Certain embodiments of the invention relate to wireless communication. More specifically, certain embodiments of the invention relate to a method and system for choice of a steering matrix (Q) for sounding in antenna selection.

BACKGROUND OF THE INVENTION

Multiple input multiple output (MIMO) systems are wireless communications systems that may transmit signals utilizing a plurality of transmitting antennas, and/or receive signals utilizing a plurality of receiving antennas. Communications between MIMO systems may be based on specifications from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream.

An exemplary wireless communication system is a wireless local area network (WLAN) system, such as is defined by IEEE 802.11 specifications. In a WLAN a physical layer protocol data unit (PPDU) represents the basic data unit transmitted and/or received in a WLAN system. The PPDU may, in turn, comprise a series of fields, such as a data field. The data field within a PPDU may also be referred to as a physical layer service data unit (PSDU), or payload. An exemplary PPDU definition may be found in an applicable standards document, such as IEEE 802.11.

A MIMO transmitter may combine spatial streams to generate one or more to-be-transmitted RF chains. A group of to-be-transmitted RF chains may be simultaneously transmitted as a signal vector X. A transmitting MIMO system may utilize a plurality of transmitting antennas when transmitting the signal vector X. A receiving MIMO system may utilize a plurality of receiving antennas when receiving a corresponding signal vector Y.

When the number of to-be-transmitted RF chains is less than the number of transmitting antennas at the MIMO transmitter, an RF chain may be transmitted simultaneously via a plurality of transmitter antennas. This technique may be referred to as transmitter diversity. When utilizing transmitter diversity, the MIMO transmitter may assign, or map, individual to-be-transmitted RF chains for transmission via individual transmitting antennas. Similarly, a MIMO receiver may utilize receiver diversity when the number of received RF chains is less than the number of receiving antennas. When utilizing receiver diversity, the MIMO receiver may assign, or map, individual received RF chains to individual receiving antennas.

Antenna selection is a procedure which may enable a MIMO transmitter to map individual RF chains to individual transmitting antennas, and/or enable a MIMO receiver to map individual RF chains to individual receiving antennas. In conventional MIMO systems, antenna selection procedures at the MIMO transmitter may enable a transmitting antenna to transmit a sequence of sounding frames that enable a MIMO receiver to communicate antenna selection feedback information. Based on the antenna selection feedback information, the MIMO transmitter may enable mapping of individual to-be-transmitted RF chains to individual transmitting antennas at the MIMO transmitter.

Following the completion of the antenna selection at the transmitter procedure, an antenna selection at the receiver procedure may be performed. In a conventional antenna selection at the receiver procedure, the MIMO receiver may transmit a request to the MIMO transmitter instructing the MIMO transmitter to send sounding frames. In response, the MIMO transmitter may repeatedly transmit a sounding frame. The sounding frame may be repeatedly transmitted utilizing a specific transmitting antenna, or a specific group of transmitting antennas. The MIMO receiver may utilize varying receiving antennas, and/or varying groups of receiving antennas for receiving each sounding frame. Based on the series of received sounding frames utilizing varying receiving antennas, the MIMO receiver may enable mapping of individual received RF chains to individual receiving antennas at the MIMO receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for choice of a steering matrix (Q) for sounding in antenna selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for choice of a steering matrix (Q) for sounding in antenna selection. In one aspect of the invention, a MIMO transmitter may transmit a sequence of sounding frames to a MIMO receiver. In various embodiments of the invention, the sounding frames may contain data from one or more spatial streams that are processed within the MIMO transmitter. The MIMO transmitter may utilize a steering (Q) matrix during processing of the data from the spatial streams. The processed data may be utilized to generate the sounding frames, which are transmitted by the MIMO transmitter. Based on the received sequence of sounding frames, the MIMO receiver may transmit antenna selection feedback information and/or channel state information (CSI) to the MIMO transmitter. The MIMO transmitter may utilize the antenna selection feedback information or CSI to determine how to transmit signals for a plurality of RF chains via a plurality of transmitting antennas.

In other embodiments of the invention, the MIMO transmitter may transmit signals by utilizing transmit diversity techniques. In this aspect of the invention, the MIMO transmitter may generate one or more space time streams based on the one or more spatial streams. The MIMO transmitter may utilize the Q matrix to process data from the space time streams. The processed data from the space time streams may be utilized to generate the sounding frames, which are transmitted by the MIMO transmitter.

The value of each of the individual matrix element within the Q matrix may be determined based on the contents of the Q matrix. For example, when each of the sounding frames comprises a null data packet (NDP), the Q matrix may be defined by an identity matrix. When one or more of the sounding frames comprises a non-NDP, the Q matrix may be defined by a fast Fourier transform (FFT) matrix.

Figure 1:
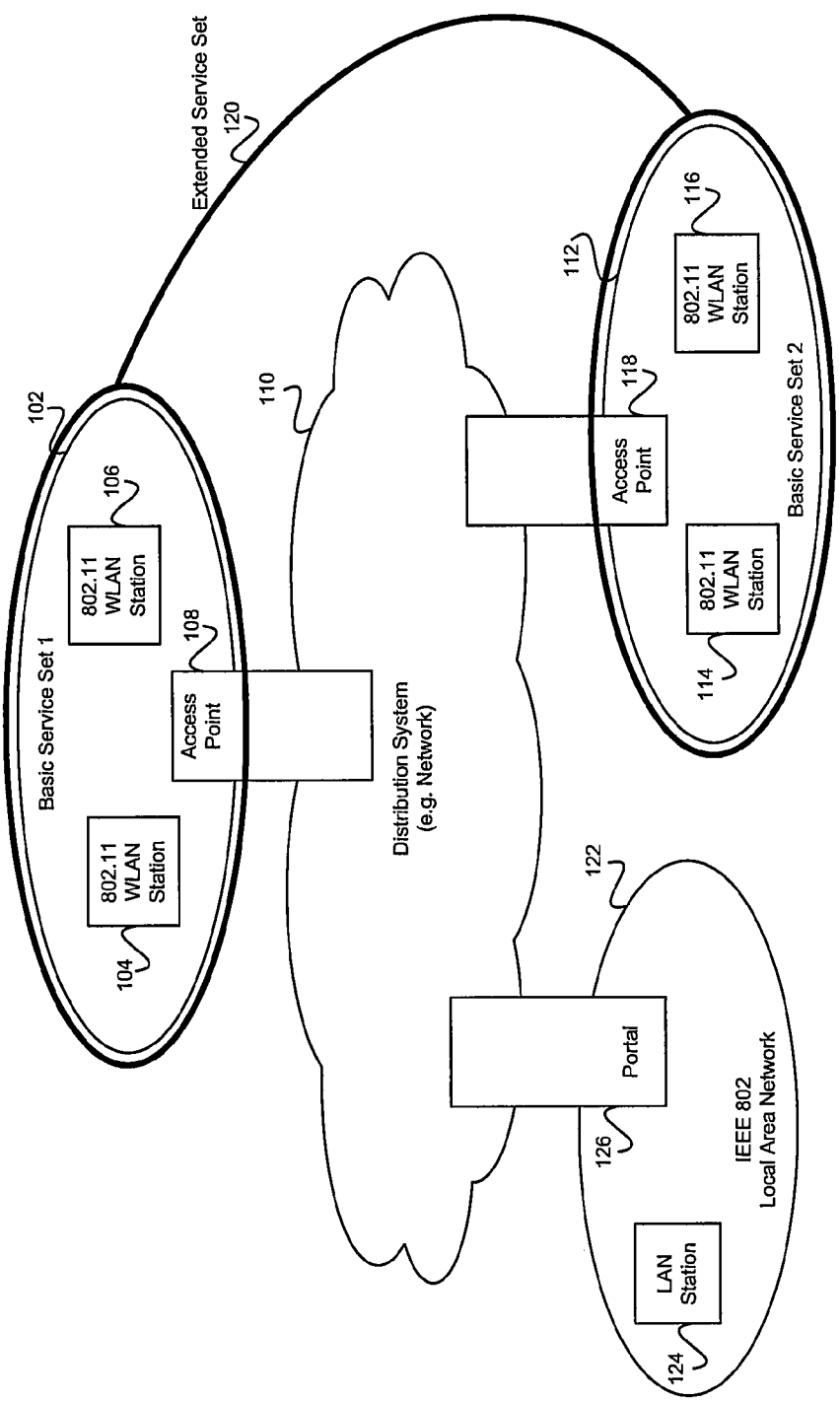
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802 LAN or WAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 or WAN may comprise a LAN or WAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that may comprise a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118.

Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN or WAN 122 such as the 802 LAN or WAN station 124. The communication of reachability information about the first 802.11 WLAN station 104 may enable WLAN stations that are not in BSS 102, but are associated with ESS 120, to communicate wirelessly with the first 802.11 WLAN station 104 through ESS 120.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN or WAN station 124 in an IEEE 802 LAN or WAN 122, implemented as, for example a wired LAN or WAN. The AP 108, AP 118, or portal 126 may provide a means by which a station in a BSS 102, BSS 112, or LAN or WAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN or WAN station 124 in LAN or WAN 122 by transmitting the information wirelessly to AP 108, which may transmit the information via the DS 110 to the portal 126, which in turn may transmit the information to the 802 LAN or WAN station 124 in LAN or WAN 122. The DS 110 may utilize wireless communications via an RF channel, wired communications, such as IEEE 802.3 or Ethernet, or a combination thereof.

A WLAN station, such as 104, 114, or AP, such as 108, 118, may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
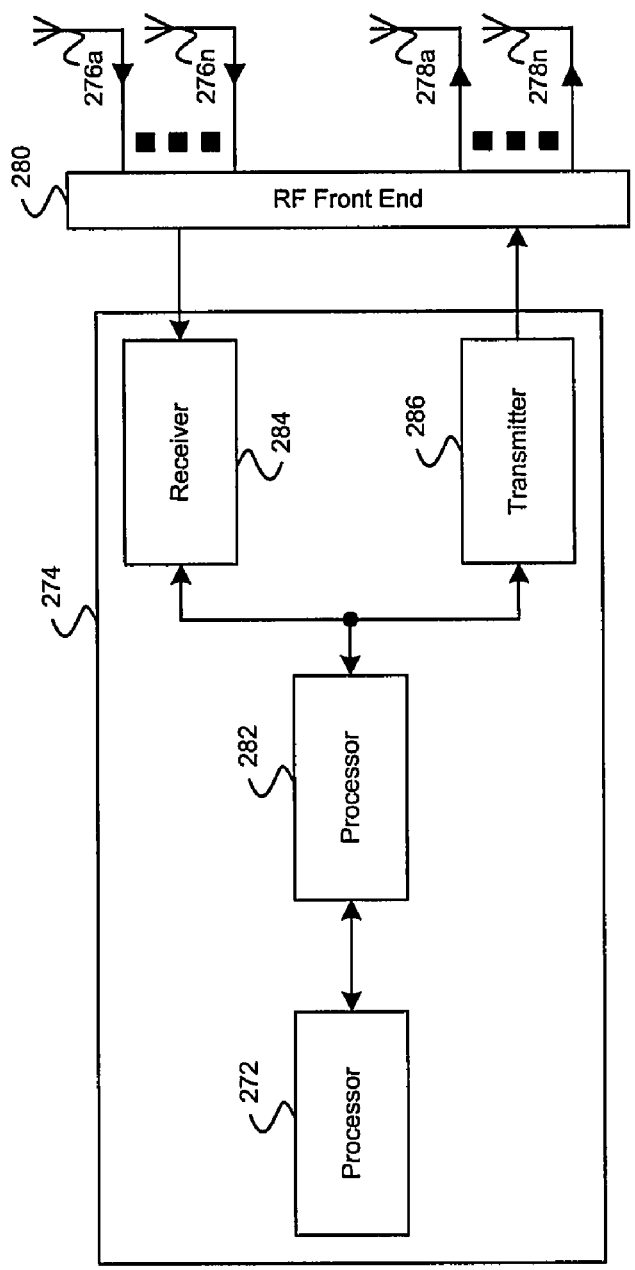
FIG. 2 is a block diagram of an exemplary wireless transceiver system that may be utilized in connection with an embodiment of the invention.

FIG. 2 is a block diagram of an exemplary wireless transceiver system that may be utilized in connection with an embodiment of the invention. The wireless transceiver may be utilized in connection with a portal 126, an access point 106, and/or an 802.11 WLAN station 104, for example. An exemplary embodiment of a transceiver may be a wireless network interface subsystem. With reference to FIG. 2 there is shown a transceiver 274, an RF front end 280, one or more receiving antennas 276a, ..., 276n, and one or more transmitting antennas 278a, ..., 278n. The transceiver 274 may comprise a processor 282, memory 272, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These tasks may further comprise medium access control (MAC) layer functions as specified by pertinent standards.

The memory 272 may comprise suitable logic, circuitry, and/or code that may be utilized to enable storage and/or retrieval of data and/or code. Stored code may, for example, comprise an implementation for a bridging and/or routing protocol. Stored data may, for example, comprise data compiled based on execution of code for a routing and/or bridging protocol. Stored data may also comprise received data, and/or data to be transmitted. Retrieved data and/or code may be assigned physical resources within the memory 272 for the storage. The stored data and/or code may be subsequently available for retrieval. Retrieved data and/or code may be output by the memory 272 and communicated to other devices, components, and/or subsystems that may be communicatively coupled, directly and/or indirectly, to the memory 272. The memory 272 may enable the stored data and/or code to remain stored and/or available for subsequent retrieval until the resources allocated for the storage are deallocated. Physical resources may be deallocated based on a received instruction that the stored data and/or code be erased from the memory 272, or based on a received instruction that the physical resources be allocated for the storage of subsequent data and/or code. The memory may utilize a plurality of storage medium technologies such as volatile memory, for example, random access memory (RAM), and/or nonvolatile memory, for example, electrically erasable programmable read only memory (EEPROM).

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that may comprise, but are not limited to, coding, puncture, interleaving, mapping, modulation control, inverse fast Fourier transform processing, beamforming processing. The RF front end 280 may receive analog RF signals via the one or more antennas 276a, . . . , 276n, by converting the RF signal to baseband and generating a digital equivalent of the received analog baseband signal. The RF front end 280 may also transmit analog RF signals via an antenna 278a, . . . , 278n, by converting a digital baseband signal to an analog RF signal.

In operation, the processor 282 may receive data from the receiver 284. The processor 282 may communicate received data to the memory 272 for storage. The processor 282 may enable retrieval of data from the memory 272 to be transmitted via an RF channel by the transmitter 286. The memory 272 may communicate the data to the processor 282. The processor 282 may generate signals to control the operation of the modulation process in the transmitter 286, and of the demodulation process in the receiver 284.

The processor 282 may also perform functions that enable antenna selection at the transmitter 286 and/or at the receiver 284. When performing antenna selection at the transmitter 286, the processor 282 may enable generation of sounding frames that may be utilized in an antenna training sequence. The sounding frames may be transmitted via one or more of the transmitting antennas 276a, . . . , and 276n. Based on feedback information received via the receiver 284, the processor 282 may perform antenna selection at the transmitter 286 by associating individual to-be-transmitted RF chains, with individual transmitting antennas 276a, . . . , and 276n. The antenna selections may be utilized when transmitting subsequent signals from the RF chains. When performing antenna selection at the receiver 284, the processor 282 may enable computation of a channel estimate matrix based on received sounding frames. The channel estimate matrix may be utilized to associate individual received RF chains with individual receiving antennas 278a, . . . , and 278n at the receiver 284. The set of receive antennas may or may not be the same as the set of transmit antennas.

Figure 3:
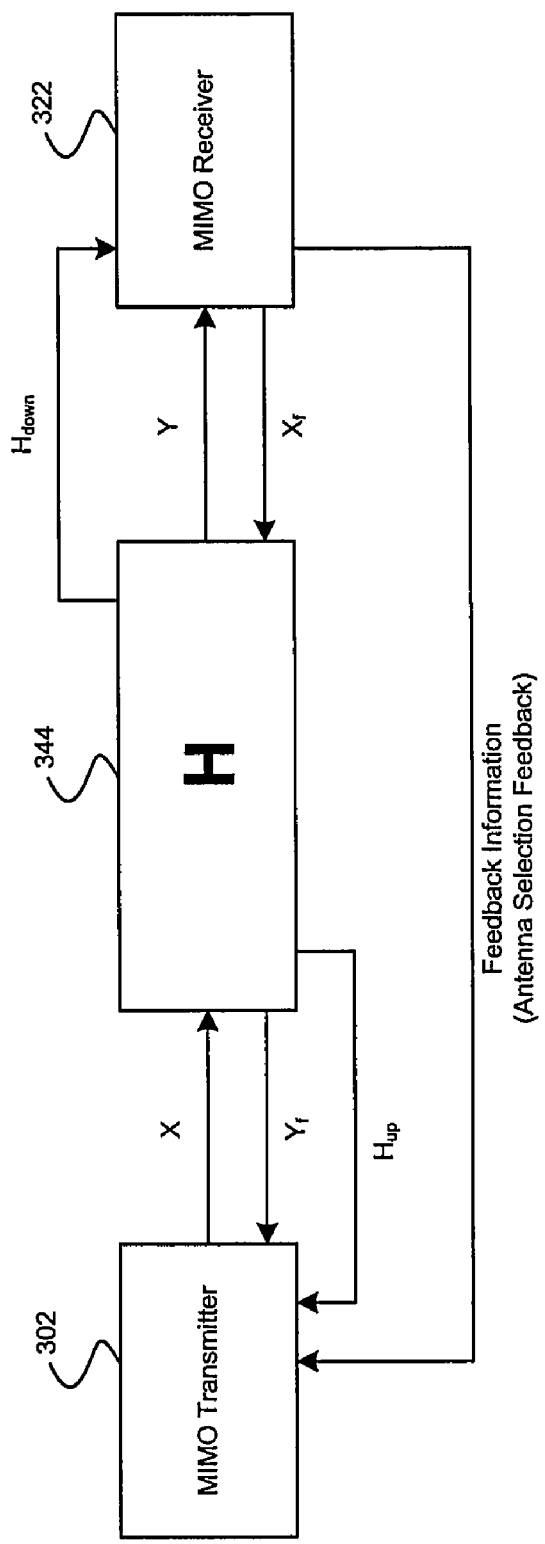
FIG. 3 is an exemplary diagram illustrating antenna selection feedback, which may be utilized in connection with an embodiment of the invention.

FIG. 3 is an exemplary diagram illustrating antenna selection feedback, which may be utilized in connection with an embodiment of the invention. Referring to FIG. 3, there is shown a transmitting mobile terminal 302, a receiving mobile terminal 322, and a communications medium 344. The communications medium 344 may represent a wireless communications medium. The transmitting mobile terminal 302 may transmit a signal vector X to the receiving mobile terminal 322 via the communications medium 344. The communications direction from the transmitting mobile terminal 302 to the receiving mobile terminal 322 may be referred to as a downlink direction. The signal vector X may comprise a plurality of spatial streams simultaneously transmitted via one or more transmitting antennas. The signal vector X may comprise signals from one or more RF chains, each comprising a sounding frame. Each of the one or more RF chains may be transmitted via one or more transmitting antennas. The signal vector X may travel through the communications medium 344. The signal vector X may be altered while traveling through the communications medium 344. The transmission characteristics associated with the communications medium 344 may be characterized by a transfer function H. The signal vector X may be altered based on the transfer function H. In the downlink direction, the transfer function H may be referred to as $H_{down}$. The altered signal vector X may be represented as the signal Y. The receiving mobile terminal 322 may receive the signal Y.

The transmitting mobile terminal 302 may transmit a series of subsequent signal vectors X corresponding to the antenna training sequence utilized in the antenna selection procedure. A subsequent signal vector X may be transmitted via a subsequent set of one or more transmitting antennas. In various embodiments of the invention, at least one of the transmitting antennas in the subsequent set may also be utilized for transmitting a previous signal vector X, and/or for transmitting a later transmitted signal vector X.

Based on the corresponding sequence of received signals Y, the receiving mobile terminal 322 may determine one or more values associated with the transfer function $H_{down}$ based on the signal Y received via the communications medium 344. Based on the sequence of received signals Y, and the computed transfer function, $H_{down}$, the receiving mobile terminal 322 may compute one antenna selection feedback vector. Each antenna selection feedback vector may comprise a plurality of bits, where each of the bits may indicate which of the transmitting antennas at the transmitting terminal 302 has been selected for assignment to the corresponding transmitted RF chain signal.

The receiving mobile terminal 322 may communicate the antenna selection feedback vectors and/or CSI via a transmitted signal vector $X_f$. The transmitted signal vector $X_f$ may be transmitted to the transmitting mobile terminal 302 via the communications medium 344. The signal vector $X_f$ may be altered while traveling through the communications medium 344. The communications direction from the receiving mobile terminal 322 to the transmitting mobile terminal 302 may be referred to as an uplink direction. The signal vector $X_f$ may be altered based on the transfer function H. In the uplink direction, the transfer function H may be referred to as $H_{up}$.

The altered signal vector $X_f$ may be represented as the signal $Y_f$. The transmitting mobile terminal 302 may receive the signal $Y_f$.

The transmitting mobile terminal 302 may assign individual transmitting antennas to individual to-be-transmitted RF chains based on one or more received signals $Y_f$. Subsequent data from a to-be-transmitted RF chain may be transmitted via one or more transmitting antennas that were assigned according to the previously received antenna selection feedback vectors.

Figure 4:
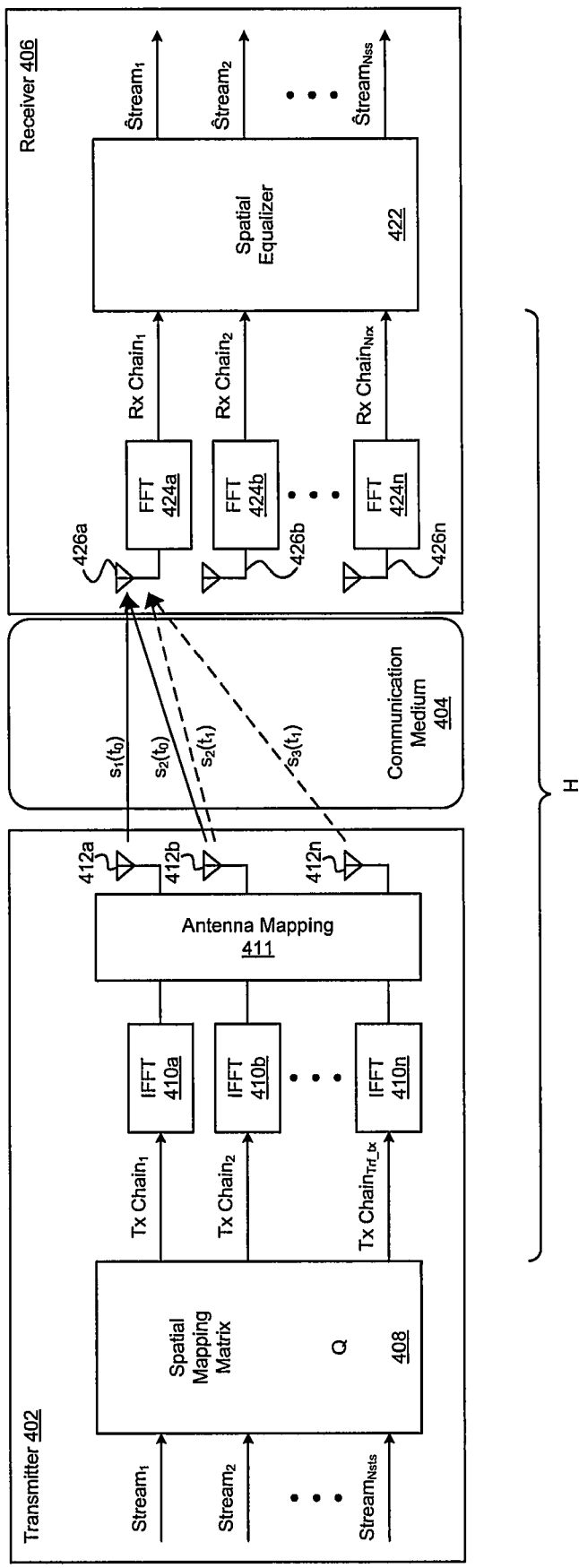
FIG. 4 is an exemplary diagram illustrating beamforming that may be utilized in connection with an embodiment of the invention.

FIG. 4 is an exemplary diagram illustrating beamforming that may be utilized in connection with an embodiment of the invention. Referring to FIG. 4, there is shown a transmitting mobile terminal 402, a receiving mobile terminal 406, and a wireless communication medium 404. An exemplary transmitting mobile terminal 402 may be a AP 108. An exemplary receiving mobile terminal 406 may be an 802.11 WLAN station 104. The transmitting mobile terminal 402 may be a MIMO system. The receiving mobile terminal 406 may be a MIMO system. The transmitting mobile terminal 402 may comprise a transmit spatial mapping matrix 408, a plurality of inverse fast Fourier transform (IFFT) blocks 410a, 410b, ..., and 410n, an antenna mapping block 411 and a plurality of transmitting antennas 412a, 412b, ..., and 412n. The receiving mobile terminal 406 may comprise a spatial equalizer 422, a plurality of fast Fourier transform (FFT) blocks 422a, 422b, ..., and 422n, and a plurality of receiving antennas 426a, 426b, ..., and 426n.

The spatial mapping matrix 408 may comprise a steering matrix Q that may perform computations on a plurality of space-time streams (where Nsts is a variable representing the number of space-time streams) and generates a plurality of to-be-transmitted RF chains, Trf_tx, wherein Trf_tx≧Nsts is a variable representing the number of to-be-transmitted RF chains. The plurality of space-time streams may comprise a first space-time stream, $Stream_1$, a second space-time stream, $Stream_2$, ... and an $Nsts^{th}$ space-time stream, $Stream_{Nsts}$. The plurality of to-be-transmitted RF chains may comprise a first transmitted RF chain, Tx $Chain_1$, a second transmitted RF chain, Tx $Chain_2$ 308, a $Trf\_tx^{th}$ transmitted RF chain, Tx $Chain_{Trf\_tx}$. Each of the to-be-transmitted RF chains Tx $Chain_1$, Tx $Chain_2$, ..., and Tx $Chain_{Trf\_tx}$, may comprise a corresponding weighted sum computed from the plurality of space-time streams $Stream_1$, $Stream_2$, ..., and $Stream_{Nsts}$, based on coefficients in the steering matrix Q.

In various embodiments of the invention, the values for individual elements in the steering matrix Q may be determined based on whether the transmitting mobile terminal 402 is transmitting sounding frames, which comprise a null data packet (NDP). In various embodiments of the invention, an NDP may be defined as a PPDU for which the payload is of zero length. When the sounding frame comprises an NDP, the steering matrix Q may be defined as an identity matrix comprising TRf_tx rows and Trf_tx columns as shown below:

$$Q = \begin{bmatrix} 1 & 0 & \cdots & 0 & 0 \\ 0 & \ddots & & 0 & \vdots \\ \vdots & 0 & 1 & 0 & \vdots \\ & \vdots & 0 & \ddots & 0 \\ 0 & 0 & \cdots & 0 & 1 \end{bmatrix} \quad [1]$$

When any of the sounding frames comprise a non-NDP (i.e. a PPDU for which the payload may be of non-zero length), the steering matrix Q may be defined as a fast Fourier transform (FFT) matrix comprising Trf_tx rows and Trf_tx columns. Each of the matrix elements within an exemplary FFT matrix may be defined as in the following equation:

$$w_{im} = \frac{1}{\sqrt{Trf\_tx}} \cdot \exp\left(-j \cdot 2 \cdot \pi \cdot \frac{i \cdot m}{Trf\_tx}\right) \quad [2]$$

where i is an index to a row in the FFT matrix (i=0, 1, ... Trf_tx−1), m is an index to a column in the FFT matrix (m=0, 1, ... Trf_tx−1), $w_{im}$ is a matrix element located in the $i^{th}$ row and $m^{th}$ column of the FFT matrix, and $j = \sqrt{-1}$. An exemplary 4×4 FFT matrix may be defined as shown below:

$$Q = \frac{1}{2} \cdot \begin{bmatrix} 1 & 1 & 1 & 1 \\ 1 & -j & -1 & j \\ 1 & -1 & 1 & -1 \\ 1 & j & -1 & -j \end{bmatrix} \quad [3]$$

In an exemplary embodiment of the invention, for which the plurality of space-time streams, $Stream_1$ ($v_1$), $Stream_2$ ($v_2$), ... $Stream_{Nsts}$ ($v_{Nsts}$) may be represented by a stream vector, V, as shown below:

$$V = \begin{bmatrix} v_1 \\ v_2 \\ \vdots \\ v_{Nsts} \\ 0_{Trf\_tx-Nsts} \end{bmatrix} \quad [4]$$

the plurality of transmit chains Tx $Chain_1$ ($x_1$), Tx $Chain_2$ ($x_2$), ... Tx $Chain_{Trf\_tx}$ ($x_{Trf\_tx}$) may be represented by a transmit chain vector, X, as shown below:

$$X = \begin{bmatrix} x_1 \\ x_2 \\ \vdots \\ x_{Trf\_tx} \end{bmatrix} = Q \times \begin{bmatrix} v_1 \\ v_2 \\ \vdots \\ v_{Nsts} \\ 0_{Trf\_tx-Nsts} \end{bmatrix} \quad [5]$$

where the steering matrix Q may be defined as shown in equation [1] when the data contained in the stream vector V comprises NDPs, and Q may be defined as shown in equation [2] when the data contained in the stream vector V comprises one or more non-NDPs. In equations [4] and [5] the vector element $0_{Trf\_tx-Nsts}$ represents a column of vector elements, which comprise a quantity of (Trf_tx-Nsts) zeros (0).

The IFFT block 410a may perform IFFT calculations to transform a frequency-domain representation of the to-be-transmitted RF chain, Tx $Chain_1$, to a time-domain representation. The IFFT block 410b may perform IFFT calculations to transform a frequency-domain representation of the to-be-transmitted RF chain, Tx $Chain_2$, to a time-domain representation. The IFFT block 410n may perform IFFT calculations to transform a frequency-domain representation of the to-be-transmitted RF chain, Tx $Chain_{Trf\_tx}$, to a time-domain representation. The plurality of simultaneously transmitted RF chains may be represented by a transmitted signal vector X.

The antenna mapping block 411 may comprise suitable logic, circuitry and/or code to enable reception of a plurality of Trf_tx time domain signals. The antenna mapping block 411 may enable selected time domain signals to be transmitted via selected antennas from a plurality of Ntx transmitting antennas 412a, 412b, . . . and 412n (where Ntx represents a number). For example, the antenna block 411 may enable the time-domain representation of the to-be-transmitted RF chain, $x_1$, to be transmitted via the transmitting antenna 412a to the wireless communications medium 404. The time-domain representation of the to-be-transmitted RF chain, $x_2$, may be transmitted via the transmitting antenna 412b to the wireless communications medium 404. The time-domain representation of the to-be-transmitted RF chain, $x_{Trf\_tx}$, may be transmitted via the transmitting antenna 412n to the wireless communications medium 404.

In an exemplary embodiment of the invention, the antenna mapping block 411 may enable the Trf_tx time domain signals to be transmitted via selected antennas from the plurality of Ntx transmitting antennas by utilizing a permutation matrix. For example, in an exemplary embodiment of the invention in which transmitting antennas 412a and 412b are utilized to concurrently transmit signals where Ntx=4 and Trf_tx=2, the permutation matrix, P, may be represented as follows:

$$P = \begin{bmatrix} 1 & 0 \\ 0 & 1 \\ 0 & 0 \\ 0 & 0 \end{bmatrix} \quad [6]$$

Given the permutation matrix, P, as shown in equation [6], the signals concurrently transmitted by the MIMO transmitting station 402 may be represented by a transmitted signal vector, S, as shown in the following equation:

$$S = \begin{bmatrix} s_1 \\ s_2 \\ s_3 \\ s_4 \end{bmatrix} = \begin{bmatrix} 1 & 0 \\ 0 & 1 \\ 0 & 0 \\ 0 & 0 \end{bmatrix} \times \begin{bmatrix} x_1 \\ x_2 \end{bmatrix} = \begin{bmatrix} x_1 \\ x_2 \\ 0 \\ 0 \end{bmatrix} \quad [7]$$

where $s_j$ represents a signal transmitted by transmitting antenna j.

The receiving antenna 426a may receive a signal $y_1$ via the wireless communications medium 404. The FFT block 424a may perform FFT calculations to transform a time-domain of the received signal, $y_1$, to a frequency-domain representation of a received RF chain, Rx Chain$_1$. The receiving antenna 426b may receive a signal $y_2$ via the wireless communications medium 404. The FFT block 424b may perform FFT calculations to transform a time-domain of the received signal, $y_2$, to a frequency-domain representation of a received RF chain, Rx Chain$_2$. The receiving antenna 426n may receive a signal $Y_{Nrx}$ via the wireless communications medium 404. Nrx may be a variable representing the number of receiving antennas at the receiving mobile terminal 406. The FFT block 424n may perform FFT calculations to transform a time-domain of the received signal, $Y_{Nrx}$, to a frequency-domain representation of a received RF chain, Rx Chain$_{Nrx}$. The plurality of received RF chains may be represented by a received signal vector Y.

The spatial equalizer 422 may comprise an equalization matrix U that performs computations on a received plurality of Nrx RF chains, and generates a plurality of Nsts estimated space-time streams. The plurality of received RF chains may comprise a first received RF chain, Rx Chain$_1$, a second received RF chain, Rx Chain$_2$ 308, an Nrx$^{th}$ received RF chain, Rx Chain$_{Nrx}$. The plurality of estimated space-time streams may comprise a first estimated space-time stream, $\hat{S}$tream$_1$, a second estimated space-time stream, $\hat{S}$tream$_2$, and an Nsts$^{th}$ estimated space-time stream, $\hat{S}$tream$_{Nss}$. Each of the plurality of estimated space-time streams at the receiving mobile terminal 406 may comprise an estimated value for a corresponding space-time stream at the transmitting mobile terminal 402.

Antenna selection is a procedure by which each individual transmitted RF chain in the plurality of transmitted RF chains may be assigned for transmission by one or more of the transmitting antennas 412a, 412b, . . . , and 412n when the number of transmitted RF chains is less than the number of transmitting antennas. In this regard, when the number of transmitted RF chains is represented by the variable Trf_tx, for which Trf_tx<Ntx. The antenna selection procedure may enable a determination of which RF chains are transmitted via which transmitting antennas. For example, when Trf_tx=2, and Ntx=3, a first transmitting antenna may transmit a first unique RF chain, Tx Chain$_1$, a second transmitting antenna may transmit a second unique RF chain, Tx Chain$_2$. The third transmit antenna will be silent.

During the antenna selection procedure, the transmitting mobile terminal 402 may transmit a sequence of sounding frames via one or more transmitting antennas. The number of sounding frames transmitted during the sequence may be equal to an integer whose value is not less than the quotient $$\frac{Ntx}{Trf\_tx},$$

where Trf_tx represents the number of RF chains at the transmitting mobile terminal.

In an exemplary embodiment of the invention for which Trf_tx=2, and Ntx=3, the antenna selection procedure may comprise transmitting a sequence of 2 sounding frames. At a time $t_0$ a first sounding frame may be transmitted via the transmitting antennas 412a and 412b in signals labeled $s_1(t_0)$ and $s_2(t_0)$ in FIG. 4. The signals may travel through the communication medium 404 and be received at the receiving antenna 426a, for example. The signal $s_1(t_0)$ may arrive at the receiving antenna 426a at a time instant $t_0+\epsilon(s_1)$. The time increment, $\epsilon(s_1)$, may represent a phase shift between the phase of the signal as transmitted from the transmitting antenna 412a, and the phase of the signal as received at the receiving antenna 426a. The signal $s_2(t_0)$ may arrive at the receiving antenna 426a at a time instant $t_0+\epsilon(s_2)$. The time increment, $\epsilon(s_2)$, may represent a phase shift between the phase of the signal as transmitted from the transmitting antenna 412b, and the phase of the signal as received at the receiving antenna 426a. The channel estimate computed at the receiving mobile terminal 406 using receiving antennas 426a, 426b and 426n from the first sounding frame may be defined as shown in the following equation:

$$H(t_0) = \begin{bmatrix} h_{11}e^{j\phi_1} & h_{12}e^{j\phi_1} \\ h_{21}e^{j\phi_1} & h_{22}e^{j\phi_1} \\ h_{31}e^{j\phi_1} & h_{32}e^{j\phi_1} \end{bmatrix} \quad [6]$$

where $\phi_1$ refers to the phase shift for the first sounding frame, and each element, $h_{jk}$, may describe channel fading properties of the wireless communications medium 404 for signals transmitted by a $k^{th}$ transmitting antenna at the transmitting mobile terminal 402, and received by a $j^{th}$ receiving antenna at the receiving mobile terminal 406

At a time $t_1$, a second sounding frame may be transmitted via the transmitting antennas 412b and 412n in signals labeled $s_2(t_1)$ and $s_3(t_1)$ in FIG. 4. The signals may travel through the communication medium 404 and be received at the receiving antenna 426a, for example. The signal $s_2(t_1)$ may arrive at the receiving antenna 426a at a time instant $t_1+\epsilon(s_2)$. The signal $s_3(t_1)$ may arrive at the receiving antenna 426a at a time instant $t_1+\epsilon(s_3)$. The channel estimate computed at the receiving mobile terminal 406 using receiving antennas 426a, 426b and 426n from the second sounding frame may be defined as shown in the following equation:

$$H(t_1) = \begin{bmatrix} h_{12}e^{j\phi_2} & h_{13}e^{j\phi_2} \\ h_{22}e^{j\phi_2} & h_{23}e^{j\phi_2} \\ h_{32}e^{j\phi_2} & h_{33}e^{j\phi_2} \end{bmatrix} \quad [9]$$

After receiving the two sounding frames, in accordance with an embodiment of the invention, the receiving mobile terminal 406 may utilize redundant information relating to transmitting antenna 2 to compute the phase shift difference $\phi_1-\phi_2$. The phase shift difference may then be utilized at the receiving mobile terminal 406 to compute a full channel estimate matrix that is a combination of $H(t_0)$ and $H(t_1)$ that is less corrupted by noise and could serve as CSI to be fed back.

Based on the computed full channel estimate matrix, the receiving mobile terminal 406 may generate one or more antenna selection feedback vectors. In the present example, the receiving mobile terminal may generate an antenna selection feedback vector. The receiving mobile terminal 406 may make antenna assignments based on various criteria. For example, the receiving mobile terminal 406 may utilize the computed full channel estimate matrix to compute capacity statistics for signals received by each of the receiving antennas 426a, 426b, ..., and 426n that were transmitted from each of the transmitting antennas 412a, 412b, ..., and 412n. Based on the capacity statistics, the receiving mobile terminal 406 may make antenna assignments. For example, if the capacity for signals transmitted via the transmitting antennas 412a and 412b is large in comparison to the capacity for signals transmitted via the antenna combinations 412a and 412n, and 412b and 412n, the antenna selection feedback vector may assign a first transmitted RF chain to the transmitting antenna 412a, and may assign a second transmitted RF chain to the transmitting antenna 412b. The antenna selection feedback vector may comprise a plurality of bits, for example 8 bits, where each bit corresponds to a transmitting antenna. In an exemplary embodiment of the invention, a bit having a value of 1 may indicate that the corresponding transmitted RF chain has been assigned to a transmitting antenna referenced by the bit. The position of a bit within the antenna selection feedback vector may serve as an index to a transmitting antenna at the transmitting mobile terminal 402.

Various embodiments of the invention may be practiced when the spatial mapping matrix 408 generates transmit chain signals based on received space-time streams, or based on received spatial streams. In this regard, the invention may be practiced when there is a one-to-one mapping between each of a plurality of Nss spatial streams to a corresponding one of an equal plurality of Nss space-time streams.

In various embodiments of the invention, the feedback information communicated from the receiving mobile terminal 322 to the transmitting mobile terminal 302 may comprise antenna selection indices, or channel state information, for example CSI based on the computed full channel estimate matrix. The antenna selection indices, or CSI may be utilized at the transmitting mobile terminal 402 for determining antenna selection, and/or for enabling beamforming.

Table 1 presents an exemplary sounding frame sequence for Trf_tx=1 in a MIMO transmitting mobile terminal 402 with Ntx transmitting antennas. In this example, a sequence of Ntx sounding frames may be transmitted in connection with the antenna selection procedure. In Table 1, the first column represents the number of transmitting antennas, Ntx, and the second column indicates the sequence number for a sounding frame in a sounding frame sequence. The third column indicates the transmitting antennas utilized for simultaneously transmitting the corresponding sounding frame in column 2. The transmitting antennas may be represented by an index where the set of transmitting antennas utilized may comprise a space separated list contained within brackets.

TABLE 1

Sounding Frame Sequence for MIMO Transmitter with Trf_tx = 1 To-Be-Transmitted RF Chain

| Ntx | Sounding Frame Sequence Number | Transmitting Antennas Transmitting Sounding Frame |
|---|---|---|
| 8 | 1 | [1] |
|   | 2 | [2] |
|   | 3 | [3] |
|   | 4 | [4] |
|   | 5 | [5] |
|   | 6 | [6] |
|   | 7 | [7] |
|   | 8 | [8] |

Table 2 presents exemplary sounding frame sequences for Trf_tx=2 in a MIMO transmitting mobile terminal 402 with Ntx transmitting antennas. For Ntx>2, Table 2 presents a plurality of alternative sounding frame sequences that may be utilized in accordance with an embodiment of the invention. In Table 2, X may represent a transmitting antenna that may be selected from the set of transmitting antennas as indicated by the indexes [1 2], Y may represent a transmitting antenna that may be selected from the set of transmitting antennas as indicated by the indexes [3 4], Z may represent [5 6], and W may represent a transmitting antenna that may be selected from the set of transmitting antennas as indicated by the indexes [7 8].

TABLE 2

Sounding Frame Sequences for MIMO Transmitter with Trf_tx = 2 To-Be-Transmitted RF Chains

| Ntx | Sounding Frame Sequence Number | Transmitting Antennas Transmitting Sounding Frame |
|---|---|---|
| 3 | 1 | [1 2] |
|   | 2 | [X 3] |
| 4 | 1 | [1 2] |
|   | 2 | [3 4] |
|   | 3 | [X Y] |
| 5 | 1 | [1 2] |
|   | 2 | [3 4] |
|   | 3 | [5 X] |
|   | 4 | [X Y] |
|   | 1 | [1 2] |
|   | 2 | [3 4] |
|   | 3 | [5 Y] |
|   | 4 | [X Y] |

TABLE 2-continued

Sounding Frame Sequences for MIMO Transmitter with Trf_tx = 2 To-Be-Transmitted RF Chains

| Ntx | Sounding Frame Sequence Number | Transmitting Antennas Transmitting Sounding Frame |
|---|---|---|
| 6 | 1 | [1 2] |
|   | 2 | [X Y] |
|   | 3 | [3 4] |
|   | 4 | [3 5] |
|   | 5 | [5 6] |
|   | 1 | [1 2] |
|   | 2 | [3 4] |
|   | 3 | [5 6] |
|   | 4 | [X Y] |
|   | 5 | [Y Z] |
|   | 1 | [1 2] |
|   | 2 | [3 4] |
|   | 3 | [5 6] |
|   | 4 | [X Z] |
|   | 5 | [Y Z] |
|   | 1 | [1 2] |
|   | 2 | [3 4] |
|   | 3 | [5 6] |
|   | 4 | [X Y] |
|   | 5 | [X Z] |
| 7 | 1 | [1 2] |
|   | 2 | [3 4] |
|   | 3 | [5 6] |
|   | 4 | [7 X] |
|   | 5 | [X Y] |
|   | 6 | [Y Z] |
|   | 1 | [1 2] |
|   | 2 | [3 4] |
|   | 3 | [5 6] |
|   | 4 | [7 X] |
|   | 5 | [X Z] |
|   | 6 | [Y Z] |
|   | 1 | [1 2] |
|   | 2 | [3 4] |
|   | 3 | [5 6] |
|   | 4 | [7 X] |
|   | 5 | [X Y] |
|   | 6 | [X Z] |
|   | 1 | [1 2] |
|   | 2 | [3 4] |
|   | 3 | [5 6] |
|   | 4 | [7 Y] |
|   | 5 | [X Y] |
|   | 6 | [Y Z] |
|   | 1 | [1 2] |
|   | 2 | [3 4] |
|   | 3 | [5 6] |
|   | 4 | [7 Y] |
|   | 5 | [X Z] |
|   | 6 | [Y Z] |
|   | 1 | [1 2] |
|   | 2 | [3 4] |
|   | 3 | [5 6] |
|   | 4 | [7 Y] |
|   | 5 | [X Y] |
|   | 6 | [X Z] |
|   | 1 | [1 2] |
|   | 2 | [3 4] |
|   | 3 | [5 6] |
|   | 4 | [7 Z] |
|   | 5 | [X Y] |
|   | 6 | [Y Z] |
|   | 1 | [1 2] |
|   | 2 | [3 4] |
|   | 3 | [5 6] |
|   | 4 | [7 Z] |
|   | 5 | [X Z] |
|   | 6 | [Y Z] |
|   | 1 | [1 2] |
|   | 2 | [3 4] |
|   | 3 | [5 6] |
|   | 4 | [7 Z] |
|   | 5 | [X Y] |
|   | 6 | [X Z] |
| 8 | 1 | [1 2] |
|   | 2 | [3 4] |
|   | 3 | [5 6] |
|   | 4 | [7 8] |
|   | 5 | [X Y] |
|   | 6 | [Y Z] |
|   | 7 | [X W] |
|   | 1 | [1 2] |
|   | 2 | [3 4] |
|   | 3 | [5 6] |
|   | 4 | [7 8] |
|   | 5 | [X Y] |
|   | 6 | [Y Z] |
|   | 7 | [Y W] |
|   | 1 | [1 2] |
|   | 2 | [3 4] |
|   | 3 | [5 6] |
|   | 4 | [7 8] |
|   | 5 | [X Y] |
|   | 6 | [Y Z] |
|   | 7 | [Z W] |
|   | 1 | [1 2] |
|   | 2 | [3 4] |
|   | 3 | [5 6] |
|   | 4 | [7 8] |
|   | 5 | [X Z] |
|   | 6 | [Y Z] |
|   | 7 | [X W] |
|   | 1 | [1 2] |
|   | 2 | [3 4] |
|   | 3 | [5 6] |
|   | 4 | [7 8] |
|   | 5 | [X Z] |
|   | 6 | [Y Z] |
|   | 7 | [Y W] |
|   | 1 | [1 2] |
|   | 2 | [3 4] |
|   | 3 | [5 6] |
|   | 4 | [7 8] |
|   | 5 | [X Z] |
|   | 6 | [Y Z] |
|   | 7 | [Z W] |
|   | 1 | [1 2] |
|   | 2 | [3 4] |
|   | 3 | [5 6] |
|   | 4 | [7 8] |
|   | 5 | [X W] |
|   | 6 | [Y W] |
|   | 7 | [X Z] |
|   | 1 | [1 2] |
|   | 2 | [3 4] |
|   | 3 | [5 6] |
|   | 4 | [7 8] |
|   | 5 | [X W] |
|   | 6 | [Y Z] |
|   | 7 | [Z W] |
|   | 1 | [1 2] |
|   | 2 | [3 4] |
|   | 3 | [5 6] |
|   | 4 | [7 8] |
|   | 5 | [X W] |
|   | 6 | [Y W] |
|   | 7 | [X Z] |
|   | 1 | [1 2] |
|   | 2 | [3 4] |
|   | 3 | [5 6] |
|   | 4 | [7 8] |
|   | 5 | [X Y] |
|   | 6 | [Y W] |
|   | 7 | [X Z] |
|   | 1 | [1 2] |
|   | 2 | [3 4] |
|   | 3 | [5 6] |
|   | 4 | [7 8] |

TABLE 2-continued

Sounding Frame Sequences for MIMO Transmitter
with Trf_tx = 2 To-Be-Transmitted RF Chains

| Ntx | Sounding Frame Sequence Number | Transmitting Antennas Transmitting Sounding Frame |
|---|---|---|
| | 5 | [X Y] |
| | 6 | [Y W] |
| | 7 | [Z W] |
| | 1 | [1 2] |
| | 2 | [3 4] |
| | 3 | [5 6] |
| | 4 | [7 8] |
| | 5 | [X W] |
| | 6 | [Y W] |
| | 7 | [Z W] |
| | 1 | [1 2] |
| | 2 | [3 4] |
| | 3 | [5 6] |
| | 4 | [7 8] |
| | 5 | [X W] |
| | 6 | [Y Z] |
| | 7 | [Z W] |

In the exemplary sounding frame sequences of Table 2, each sounding frame may have a time duration of about 28 μseconds in a greenfield WLAN system, or about 40 μseconds in a mixed mode WLAN system.

Table 3 presents an exemplary sounding frame sequence for Trf_tx=3 in a MIMO transmitting mobile terminal 402 with Ntx=4 transmitting antennas. In Table 3, X may represent a transmitting antenna that may be selected from the set of transmitting antennas as indicated by the indexes [1 2 3].

TABLE 3

Sounding Frame Sequences for MIMO
Transmitter with Ntx = 4, and Trf_tx = 3 To-Be-
Transmitted RF Chains

| Sounding Frame Sequence Number | Transmitting Antennas Transmitting Sounding Frame |
|---|---|
| 1 | [1 2 3] |
| 2 | [X 3 4] |
| 1 | [1 2 3] |
| 2 | [X 4] |

In the first 3 rows of Table 3, each sounding frame may have a time duration of about 72 μseconds in a greenfield WLAN system, or about 96 μseconds in a mixed mode WLAN system. In the fourth row of Table 3, each sounding frame may have a time duration of about 64 μseconds in a greenfield WLAN system, or about 88 μseconds in a mixed mode WLAN system.

Table 4 presents exemplary sounding frame sequences for Trf_tx=3 in a MIMO transmitting mobile terminal 402 with Ntx>4 transmitting antennas. In Table 4, X may represent a transmitting antenna that may be selected from the set of transmitting antennas as indicated by the indexes [1 2 3], and Y may represent a transmitting antenna that may be selected from the set of transmitting antennas as indicated by the indexes [4 5 6].

TABLE 4

Sounding Frame Sequences for MIMO Transmitter
with Trf_tx = 3 To-Be-Transmitted RF Chains

| Ntx | Sounding Frame Sequence Number | Transmitting Antennas Transmitting Sounding Frame |
|---|---|---|
| 5 | 1 | [1 2 3] |
| | 2 | [X 4 5] |
| 6 | 1 | [1 2 3] |
| | 2 | [4 5 6] |
| | 3 | [X Y 5] |
| | 1 | [1 2 3] |
| | 2 | [4 5 6] |
| | 3 | [X Y] |
| 7 | 1 | [1 2 3] |
| | 2 | [4 5 6] |
| | 3 | [X Y 7] |
| 8 | 1 | [1 2 3] |
| | 2 | [4 5 6] |
| | 3 | [X 7 8] |
| | 4 | [Y 7 8] |
| | 1 | [1 2 3] |
| | 2 | [4 5 6] |
| | 3 | [X 7 8] |
| | 4 | [X Y] |

Table 5 presents exemplary sounding frame sequences for Trf_tx=4 in a MIMO transmitting mobile terminal 402 with Ntx>5 transmitting antennas. In Table 5, $X_1$, $X_2$, and $X_3$ may each represent a transmitting antenna that may be selected from the set of transmitting antennas as indicated by indexes [1 2 3 4], and $Y_1$, $Y_2$, and $Y_3$ may each represent a transmitting antenna that may be selected from the set of transmitting antennas as indicated by the indexes [5 6 7 8].

TABLE 5

Sounding Frame Sequences for MIMO Transmitter
with Trf_tx = 4 To-Be-Transmitted RF Chains

| Ntx | Sounding Frame Sequence Number | Transmitting Antennas Transmitting Sounding Frame |
|---|---|---|
| 5 | 1 | [1 2 3 4] |
| | 2 | [X 5] |
| | 1 | [1 2 3 4] |
| | 2 | [$X_1 X_2 X_3$ 5] |
| 6 | 1 | [1 2 3 4] |
| | 2 | [X 5 6] |
| | 1 | [1 2 3 4] |
| | 2 | [$X_1 X_2$ 5 6] |
| 7 | 1 | [1 2 3 4] |
| | 2 | [X 5 6 7] |
| 8 | 1 | [1 2 3 4] |
| | 2 | [5 6 7 8] |
| | 3 | [$X_1 X_2 Y_1 Y_2$] |
| | 1 | [1 2 3 4] |
| | 2 | [5 6 7 8] |
| | 3 | [$X_1 X_2 X_3 Y_2$] |
| | 1 | [1 2 3 4] |
| | 2 | [5 6 7 8] |
| | 3 | [$X_1 Y_1 Y_2 Y_3$] |

Various embodiments of the invention enable joint selection of transmitting antennas and receiving antennas. In a joint antenna selection process, the receiving mobile terminal 406 may transmit a receive antenna selection sounding request to the transmitting mobile terminal 402. The receive antenna selection sounding request may comprise a request that the transmitting mobile terminal 402 commence transmitting a sequence of sounding frames, wherein each sounding frame may be repeated a number of times as specified in the request. For each repetition of a given sounding frame, the receiving mobile terminal 406 may select a set of receiving antennas 426a, 426b, . . . , and 426n, which may be utilized to receive the sounding frame. The number of repetitions of each sounding frame transmitted during the sequence may be equal to an integer whose value is not less than the quotient Nrx/Trf_rx, where Trf_rx represents the number of RF chains at the receiving mobile terminal 406.

After the sequence of sounding frames has been transmitted, the receiving mobile terminal 406 may compute a channel estimate matrix, which may be utilized for making antenna selections at the receiver. The receiving mobile terminal 406 may also generate an antenna selection feedback vector or CSI. The receiving mobile terminal 406 may transmit the antenna selection feedback vectors or CSI, which may be utilized by the transmitting mobile terminal, as described above. Thus, in various embodiments of the invention, the joint antenna selection process may enable antenna selection to be performed at the receiving mobile terminal 406, and at the transmitting mobile terminal, based on a single sequence of transmitted sounding frames.

For example, with reference to FIG. 4, in a MIMO system for which Trf_tx=2, Trf_rx=2, Ntx=4, and Nrx=4, the receiving mobile terminal 406 may transmit a receive antenna selection sounding request that requests that the transmitting mobile terminal 402 commence an antenna selection process in which each sounding frame may be transmitted 2 times. The transmitting mobile terminal 402 may transmit a first sounding frame at a time instant $t_0$ utilizing transmitting antennas 1 and 2. The receiving mobile terminal 406 may receive the transmitted signals that carry the first sounding frame by utilizing receiving antennas 1, and 2, for example. The transmitting mobile terminal 402 may transmit the first sounding frame a second time at a time instant $t_1$, again utilizing transmitting antennas 1 and 2. The receiving mobile terminal 406 may receive the transmitted signals that carry the first sounding frame during the second iteration by utilizing receiving antennas 3 and 4, for example.

Table 6 presents an exemplary sounding frame sequence for Trf_tx=2 in a MIMO transmitting mobile terminal 402 with Ntx=4 transmitting antennas. In Table 6, $X_j$ may represent a transmitting antenna that may be selected from the set of transmitting antennas as indicated by [1 2] and $Y_j$ may represent a transmitting antenna selected from the set of transmitting antennas [3 4]. $X_k$ may represent a receiving antenna that may be selected from the set of receiving antennas as indicated by [1 2], $Y_k$ may represent a receiving antenna selected from the set of receiving antennas [3 4], and $Z_k$ may represent a receiving antenna selected from the set of receiving antennas [5 6]. Selection of a transmitting antenna $X_j$ and/or $Y_j$ may be performed independently from selection of a receiving antenna $X_k$, $Y_k$ and/or $Z_k$.

TABLE 6

| | | | Transmitting Antennas | Receiving Antenna |
|---|---|---|---|---|
| | | Sounding Frame Sequence | Transmitting Sounding | Receiving Sounding |
| Ntx | Nrx | Number | Frame | Frame |
| 4 | 4 | 1 | [1 2] | [1 2] |
| | | 2 | [1 2] | [3 4] |
| | | 3 | [3 4] | [1 2] |
| | | 4 | [3 4] | [3 4] |
| | | 5 | [$X_j$ $Y_j$] | [$X_k$ $Y_k$] |

TABLE 6-continued

| | | | Transmitting Antennas | Receiving Antenna |
|---|---|---|---|---|
| | | Sounding Frame Sequence | Transmitting Sounding | Receiving Sounding |
| Ntx | Nrx | Number | Frame | Frame |
| 4 | 6 | 1 | [1 2] | [1 2] |
| | | 2 | [1 2] | [3 4] |
| | | 3 | [1 2] | [5 6] |
| | | 4 | [3 4] | [1 2] |
| | | 5 | [3 4] | [3 4] |
| | | 6 | [3 4] | [5 6] |
| | | 7 | [$X_j$ $Y_j$] | [$X_k$ $Y_k$] |
| | | 8 | [$X_j$ $Y_j$] | [$Y_k$ $Z_k$] |

Referring to Table 6, in a conventional system, for Ntx=4 and Nrx=4, 36 sequences may be transmitted to get an estimate of the channel or to do antenna selection. In various embodiments of the invention, 5 sequences may be transmitted to get an estimate of the channel. For Ntx=4 and Nrx=6, in a conventional system, 90 sequences may be transmitted to get an estimate of the channel. In various embodiments of the invention, 8 sequences may be transmitted to get an estimate of the channel.

Figure 5:
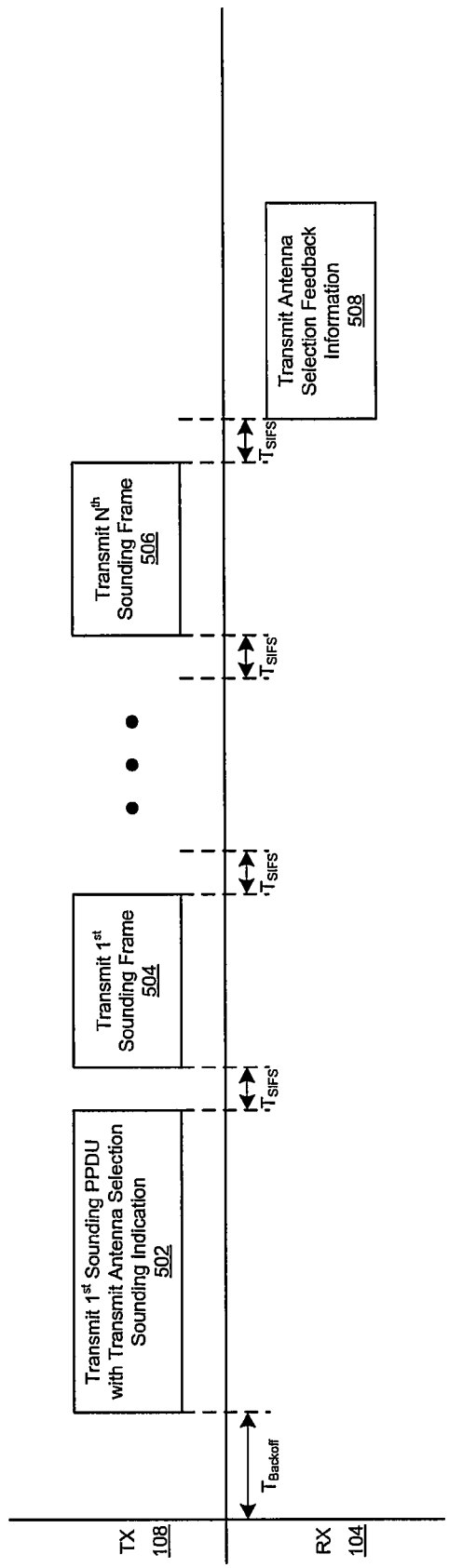
FIG. 5 is a diagram that illustrates an exemplary frame exchange for antenna selection at the transmitter, in accordance with an embodiment of the invention.

FIG. 5 is a diagram that illustrates an exemplary frame exchange for antenna selection at the transmitter, in accordance with an embodiment of the invention. Referring to FIG. 5, there is shown a plurality of frames sent by a MIMO transmitter, for example an AP 108 (FIG. 1), and by a MIMO receiver, for example an 802.11 WLAN station 104. Before the MIMO transmitter 108 attempts to transmit a first sounding frame in an antenna selection procedure, a backoff time duration, which is indicated as $T_{Backoff}$ in FIG. 5, may elapse.

In frame 502, the MIMO transmitter 108 may transmit a first sounding frame in an antenna selection procedure. The first sounding frame may comprise a sequence number indicating that frame 502 is a first sounding frame, and/or indicating the number of subsequent sounding frames may be transmitted during the antenna selection procedure. The first sounding frame may be simultaneously transmitted by one or more transmitting antenna as shown in Tables 1-6 above. The first sounding frame may also comprise an indication that subsequent sounding frames transmitted during the antenna selection procedure will be sounding frames, where sounding frames in the present invention may be as defined in the IEEE P802.11n™/D2.07 specification.

At the end of transmission of the sounding frame 502, a short interframe spacing (SIFS) time interval, the duration of which is indicated as $T_{SIFS}$ in FIG. 5, may begin. The SIFS time interval may specify a time duration that may elapse before the MIMO transmitter 108 may transmit a second sounding frame in the antenna selection procedure.

In frame 504, the MIMO transmitter 108 may transmit a first sounding frame in the antenna selection procedure. The first sounding frame may be a second sounding frame transmitted in the antenna selection procedure. The second sounding frame may comprise a sequence number indicating that frame 504 is a second sounding frame, and/or indicating the number of subsequent sounding frames may be transmitted during the antenna selection procedure. The second sounding frame may be simultaneously transmitted by one or more transmitting antenna as shown in Tables 1-6 above.

At the end of transmission of the sounding frame 504, another SIFS time interval, may begin. The SIFS time interval may specify a time duration that may elapse before the MIMO transmitter 108 may transmit a following sounding frame in the antenna selection procedure. Each subsequent transmission of a sounding frame in the antenna selection procedure may be followed by a SIFS time interval.

In frame 506, the MIMO transmitter 108 may transmit a last sounding frame in the antenna selection procedure. The last sounding frame may be a sounding frame, which may be the last of N sounding frames transmitted in the antenna selection procedure, where N may represent the number of sounding frames transmitted during the antenna selection procedure. The last sounding frame may comprise a sequence number indicating that frame 506 is a last sounding frame, and/or indicating that no subsequent sounding frames may be transmitted during the antenna selection procedure. The last sounding frame may be simultaneously transmitted by one or more transmitting antenna as shown in Tables 1-6 above.

At the end of transmission of the sounding frame 506, a SIFS time interval, the duration of which is indicated as $T_{SIFS}$ in FIG. 5, may begin. The SIFS time interval may specify a time duration that may elapse before the MIMO receiver 104 may begin to transmit antenna selection feedback information. At the end of the SIFS time interval, the MIMO receiver 104 may transmit the antenna selection feedback information frames 508 to the MIMO transmitter 108. The antenna selection feedback frames 508 may comprise one or more antenna selection feedback vectors.

Based on the procedure for antenna selection at the transmitter as illustrated in FIG. 5, the MIMO transmitter 108 may transmit a sequence of sounding frames to the MIMO receiver 104. The sequence in which the sounding frames are transmitted by the MIMO transmitter 108, and the transmitting antennas utilized for transmitted each sounding frame may be known at the MIMO receiver 104. In various embodiments of the invention, the MIMO receiver may utilize the knowledge about the sounding frame transmission sequence to compute phase relationships between signals transmitted by the MIMO transmitter 108 and received by the MIMO receiver 104. The ability to compute phase relationships between the signals may enable the MIMO transmitter 108 to transmit fewer sounding frames in the sequence than in conventional antenna selection procedures.

The MIMO receiver 104 may compute a channel estimate matrix based on the received sounding frames. Based on the computed channel estimate matrix, the MIMO receiver 104 may generate CSI, or an antenna selection feedback vector. The MIMO transmitter 108 may utilize the data contained in the CSI, or antenna selection feedback vector, to assign individual to-be-transmitted RF chains to individual transmitting antennas. The MIMO transmitter 108 may utilize the assignments when transmitting subsequent signals in a MIMO communication system.

Figure 6:
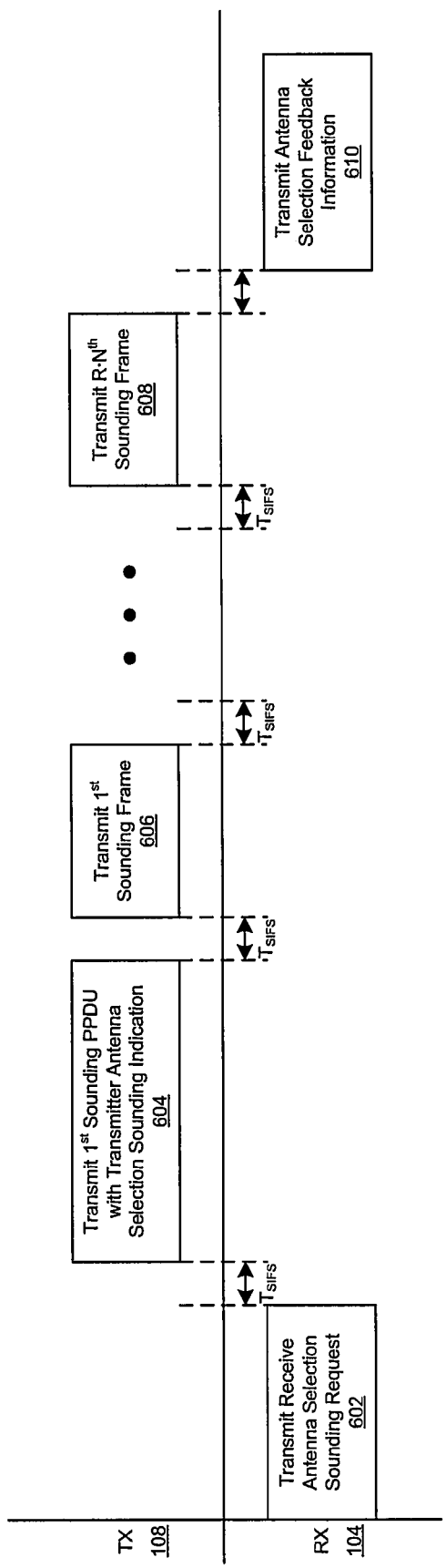
FIG. 6 is a diagram that illustrates an exemplary frame exchange for joint antenna selection at the transmitter and at the receiver, in accordance with an embodiment of the invention.

FIG. 6 is a diagram that illustrates an exemplary frame exchange for joint antenna selection at the transmitter and at the receiver, in accordance with an embodiment of the invention. Referring to FIG. 6, there is shown a plurality of frames sent by a MIMO transmitter, for example an AP 108 (FIG. 1), and by a MIMO receiver, for example an 802.11 WLAN station 104.

In frame 602, the MIMO receiver 104 may initiate joint transmit and receive antenna selection by transmitting a receive antenna sounding request. The receive antenna sounding request may request that the MIMO transmitter 108 begin to transmit a sequence of sounding frames in an antenna selection procedure. The receive antenna sounding request may also comprise a request that each sounding frame in the sequence be transmitted a plurality of R times, where R may represent a number of sounding frame repetitions being requested by the MIMO receiver 104. The MIMO receiver 104 may compute the value for R based on the number of receiving antennas, Nrx, and the number of receiving RF chains Trf_rx.

Various embodiments of the invention may provide an efficient method for computing phase shift differences between channel estimate matrices $H(t_0)$ and $H(t_1)$ as shown in equations [8] and [9] respectively. For example, based on the respective last rows of the channel estimate matrices $H(t_0)$ and $H(t_1)$, for the exemplary case Trf_rx=2, a phase shift difference $\phi_3$ may be computed, wherein $\phi_3 = \phi_1 - \phi_2$. In various embodiments of the invention, the ability to compute phase shift differences based on transmitted sounding frames may enable joint antenna selection and accurate channel state information.

At the end of transmission of the sounding frame 602, a short interframe spacing (SIFS) time interval, the duration of which is indicated as $T_{SIFS}$ in FIG. 6, may begin. The SIFS time interval may specify a time duration that may elapse before the MIMO transmitter 108 may transmit a sounding frame in response to the sounding frame 602 in the joint antenna selection procedure.

In frame 604, the MIMO transmitter 108 may transmit a first sounding frame in the joint antenna selection procedure. The first sounding frame may comprise a sequence number indicating that frame 604 is a first sounding frame, and/or indicating the number of subsequent sounding frames may be transmitted during the joint antenna selection procedure. The first sounding frame may be simultaneously transmitted by one or more transmitting antennas at the MIMO transmitter 108 and received by one or more receiving antennas at the MIMO receiver 104 as shown in Table 6 above.

At the end of transmission of the sounding frame 604, another SIFS time interval, may begin. The SIFS time interval may specify a time duration that may elapse before the MIMO transmitter 108 may transmit a following sounding frame in the joint antenna selection procedure.

In frame 606, the MIMO transmitter 108 may transmit a first sounding frame in the antenna selection procedure. For values of R>1, the MIMO transmitter 108 may transmit the first sounding frame via the same transmitting antennas utilized for transmitting frame 604. However, at the MIMO receiver 104, on or more of the receiving antennas utilized to receive frame 606 may not have been utilized to receive frame 604 as shown in Table 6 above.

At the end of transmission of the sounding frame 606, another SIFS time interval, may begin. The SIFS time interval may specify a time duration that may elapse before the MIMO transmitter 108 may transmit a following sounding frame in the joint antenna selection procedure. Each subsequent transmission of a sounding frame in the joint antenna selection procedure may be followed by a SIFS time interval.

In frame 608, the MIMO transmitter 108 may transmit a last sounding frame in the joint antenna selection procedure. The last sounding frame may be simultaneously transmitted by one or more transmitting antennas at the MIMO transmitter 108, and received by one or more receiving antennas at the MIMO receiver as shown in Table 6 above.

At the end of transmission of the sounding frame 608, a SIFS time interval, the duration of which is indicated as $T_{SIFS}$ in FIG. 6, may begin. The SIFS time interval may specify a time duration that may elapse before the MIMO receiver 104 may begin to transmit antenna selection feedback information. At the end of the SIFS time interval, the MIMO receiver 104 may transmit the antenna selection feedback information frames 610 to the MIMO transmitter 108. The antenna selection feedback frames 508 may comprise an antenna selection feedback vector.

Based on the procedure for joint antenna selection as illustrated in FIG. 6, the MIMO receiver 104 may request that the MIMO transmitter 108 may transmit a sequence of sounding frames to the MIMO receiver 104. The request may also instruct the MIMO transmitter 108 to transmit each sounding frame in the sequence a number of times as indicated by the repetition indicator R. The sequence in which the sounding frames are transmitted by the MIMO transmitter 108, and the transmitting antennas utilized for transmitted each sounding frame may be known at the MIMO receiver 104. The MIMO transmitter 108 may transmit a current sounding frame in the sequence R times before transmitting a subsequent sounding frame. In various embodiments of the invention, the MIMO receiver may utilize the knowledge about the sounding frame transmission sequence to compute phase relationships between signals transmitted by the MIMO transmitter 108 and received by the MIMO receiver 104.

The MIMO receiver 104 may compute one or more channel estimate matrices based on the received sounding frames. The MIMO receiver 104 may compute a set of R channel estimate matrices; one for each receiving antenna configuration utilized during the joint antenna selection procedure, for example. Based on the computed channel estimate matrices, the MIMO receiver 104 may assign an individual received RF chain to an individual receiving antenna. The assignment may be utilized at the MIMO receiver 104 during spatial equalization as performed by the spatial equalizer block 422. The MIMO receiver 104 may also generate an antenna selection feedback vector. The MIMO transmitter 108 may utilize the data contained in the antenna selection feedback vector to assign individual to-be-transmitted RF chains to individual transmitting antennas. The MIMO transmitter 108 may utilize the assignments when transmitting subsequent signals in a MIMO communication system.

Thus, in various embodiments of the invention, the joint antenna selection procedure may enable a MIMO receiver 104, and a MIMO transmitter 108, to make antenna selection assignments based on a single transmitted sounding frame sequence as shown in FIG. 6, comprising frames 602, 604, 606, . . . , and 608, and 610.

Figure 7:
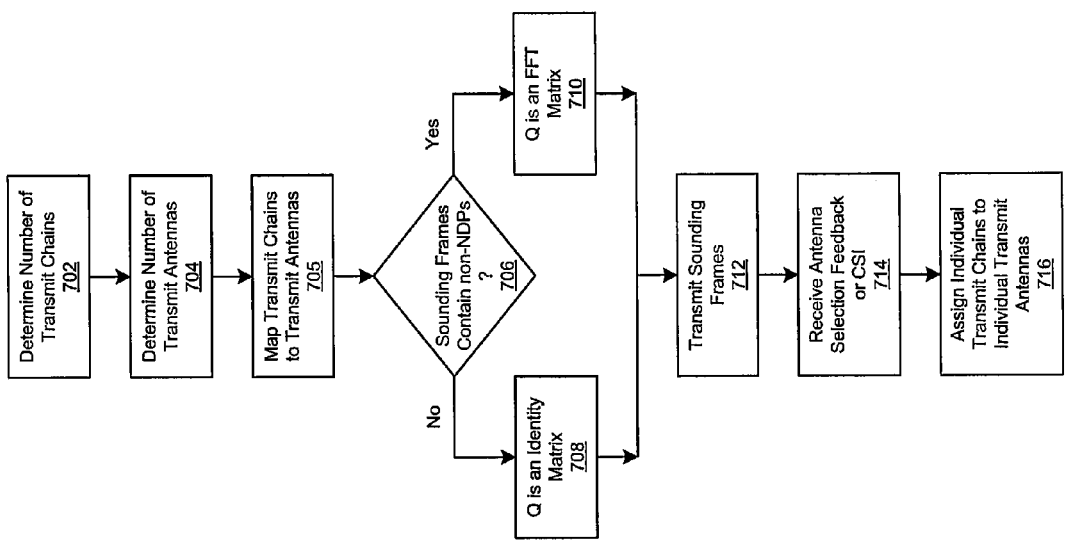
FIG. 7 is a flowchart illustrating exemplary steps for antenna selection at the transmitter with Q matrix selection, in accordance with an embodiment of the invention.

FIG. 7 is a flowchart illustrating exemplary steps for antenna selection at the transmitter with Q matrix selection, in accordance with an embodiment of the invention. Referring to FIG. 7, in step 702, a transmitting mobile terminal 402 may determine a number of to-be-transmitted RF chains, Trf_tx. In step 704, the transmitting mobile terminal 402 may determine the number of transmitting antennas 412a, 412b, . . . , and 412n, Ntx. In step 705, the antenna mapping block 411 may map the Trf_tx number of RF chains to the Ntx number of transmitting antennas. In step 706, the transmitting mobile terminal 402 may determine whether transmitted sounding frames comprise one or more non-null data packets (NDPs). When the sounding frames to be transmitted comprise one or more non-NDPs, in step 710, the steering matrix, Q, may computed based on an FFT matrix as shown in equation [2], for example. When the sounding frames to be transmitted do not comprise one or more non-NDPs, in step 708, the steering matrix, Q, may be computed based on an identity matrix. The contents of the sounding frames may computed as shown in equation [5], for example. In step 712, the transmitting mobile terminal 402 may transmit a sequence of sounding frames. The number of sounding frames transmitted may be determined based on the variables Trf_tx, Trf_rx, Ntx, and/or the number of receiving antennas at the receiving mobile terminal 406, Nrx. After transmitting the sequence of sounding frames in step 712, in step 714, the transmitting mobile terminal 402 may receive an antenna selection feedback vector and/or CSI. The antenna selection feedback vectors may be transmitted by the receiving mobile terminal 406. In step 716, the transmitting mobile terminal 402 may assign individual transmit chains, Tx Chain, to individual transmitting antennas 412a, 412b, . . . , and 412n.

Aspects of a method and system for choice of a steering matrix (Q) for sounding in antenna selection may include a transmitting station 402 that enables determination of values for a plurality of matrix elements, which are represented in a steering matrix (Q). The contents of the steering matrix may be determined based on the contents of a plurality of protocol data units (PDU). Each of the PDUs may comprise a sounding frame. One or more space-time signals may be generated based on the plurality of PDUs. One or more transmit chain signals may be generated by multiplying a vector representation, which comprises the one or more space-time signals, by the steering matrix. One or more transmit chain signals may be transmitted via transmitting antennas selected from a plurality of transmitting antennas.

The steering matrix may comprise an identity matrix, as shown in equation [1] for example, when the PDUs comprise a null data packet (NDP). The number of rows and columns in the steering matrix may be determined based on the number of transmit chains, Trf_tx. A distinct group of one or more transmit chain signals may be represented by a transmit chain.

When one or more PDUs comprise a non-NDP, the value of each of the matrix elements may be defined as shown in equation [2], for example. When one or more PDUs comprise a non-NDP, the number of rows and columns in the steering matrix may be determined based on the value, Trf_tx.

A transmitted signal vector, S as shown in equation [7] for example, may be generated based on the one or more transmit chains and a permutation matrix, P, as shown in equation [6] for example. The transmitted signal vector S may be generated by multiplying a vector representation that comprises the one or more transmit chains and the permutation matrix. The transmitted signal vector S may be a vector representation that comprises the transmitted transmit chain signals. The permutation matrix may enable selection of the transmitting antennas among the plurality of transmitting antennas.

Another embodiment of the invention may provide a machine-readable storage having stored thereon, a computer program having at least one code section executable by a machine, thereby causing the machine to perform steps as described herein for choice of a steering matrix (Q) for sounding in antenna selection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a wireless communication system, the method comprising:
   generating one or more space-time signals based on a plurality of protocol data units, wherein each of said plurality of protocol data units comprises a sounding frame and contents of said plurality of sounding frames are utilized to generate a steering matrix;
   generating one or more transmit chain signals by multiplying a vector representation, which comprises said one or more space-time signals, by said generated steering matrix; and
   transmitting said one or more generated transmit chain signals via selected ones of a plurality of transmitting antennas.

2. The method according to claim 1, wherein said generated steering matrix comprises an identity matrix when each of said plurality of protocol data units comprises a null data packet.

3. The method according to claim 2, wherein a number of rows in said generated steering matrix and a number of columns in said generated steering matrix are each determined based on a number of distinct groups of said one or more generated transmit chain signals.

4. The method according to claim 3, wherein each of said distinct groups of said one or more generated transmit chain signals is a distinct transmit chain.

5. The method according to claim 1, comprising generating a plurality of matrix elements in said generated steering matrix, wherein each of said generated plurality of matrix elements is defined based on the following equation:

$$w_{im} = \frac{1}{\sqrt{\text{Trf\_tx}}} \cdot \exp\left(-j \cdot 2 \cdot \pi \cdot \frac{i \cdot m}{\text{Trf\_tx}}\right)$$

where i represents an index to a row location in said generated steering matrix m represents an index to a column location in said generated steering matrix, $w_{im}$ represents said each of said plurality of matrix elements located at row location i and column location m within said generated steering matrix and Trf_tx represents a number of distinct groups of said one or more generated transmit chain signals;
when at least one of said plurality of protocol data units comprises a non-null data packet.

6. The method according to claim 5, wherein each of said distinct groups of said one or more generated transmit chain signals is a distinct transmit chain stream.

7. The method according to claim 5, wherein a number of rows in said generated steering matrix and a number of columns in said generated steering matrix are each determined based on a number of said distinct groups of said one or more generated transmit chain signals.

8. The method according to claim 5, comprising generating a transmitted signal vector based on one or more of said distinct groups of said one or more transmit signal chains and a permutation matrix.

9. The method according to claim 8, comprising generating said transmitted signal vector by multiplying a vector representation comprising said one or more of said distinct groups of said one or more transmit signal chains by said permutation matrix.

10. The method according to claim 8, wherein said transmitted signal vector is a vector representation that comprises said transmitted one or more generated transmit chain signals.

11. The method according to claim 8, comprising selecting said ones of said plurality of transmitting antennas based on said permutation matrix.

12. A system for communicating information in a wireless communication system, the system comprising:
   one or more circuits that enable generation of one or more space-time signals based on a plurality of protocol data units, wherein each of said plurality of protocol data units comprises a sounding frame and contents of said plurality of sounding frames are utilized to generate a steering matrix;
   said one or more circuits enable generation of one or more transmit chain signals by multiplying a vector representation, which comprises said one or more space-time signals, by said generated steering matrix; and
   said one or more circuits enable transmission of said one or more generated transmit chain signals via selected transmitting antennas among a plurality of transmitting antennas.

13. The system according to claim 12, wherein said generated steering matrix comprises an identity matrix when each of said plurality of protocol data units comprises a null data packet.

14. The system according to claim 13, wherein a number of rows in said generated steering matrix and a number of columns in said generated steering matrix are each determined based on a number of distinct groups of said one or more generated transmit chain signals.

15. The system according to claim 14, wherein each of said distinct groups of said one or more generated transmit chain signals is a distinct transmit chain.

16. The system according to claim 12, wherein said one or more circuits enable generation of a plurality of matrix elements in said generated steering matrix, wherein each of said generated plurality of matrix elements is defined based on the following equation:

$$w_{im} = \frac{1}{\sqrt{\text{Trf\_tx}}} \cdot \exp\left(-j \cdot 2 \cdot \pi \cdot \frac{i \cdot m}{\text{Trf\_tx}}\right)$$

where i represents an index to a row location in said generated steering matrix m represents an index to a column location in said generated steering matrix, $w_{im}$ represents said each of said plurality of matrix elements located at row location i and column location m within said generated steering matrix and Trf_tx represents a number of distinct groups of said one or more generated transmit chain signals;

when at least one of said plurality of protocol data units comprises a non-null data packet.

17. The system according to claim 16, wherein each of said distinct groups of said one or more generated transmit chain signals is a distinct transmit chain stream.

18. The system according to claim 16, wherein a number of rows in said generated steering matrix and a number of columns in said generated steering matrix are each determined based on a number of said distinct groups of said one or more generated transmit chain signals.

19. The system according to claim 16, wherein said one or more circuits enable generation of a transmitted signal vector based on one or more of said distinct groups of said one or more transmit signal chains and a permutation matrix.

20. The system according to claim 19, wherein said one or more circuits enable generation of said transmitted signal vector by multiplying a vector representation comprising said one or more of said distinct groups of said one or more transmit signal chains by said permutation matrix.

21. The system according to claim 19, wherein said transmitted signal vector is a vector representation that comprises said transmitted one or more generated transmit chain signals.

22. The system according to claim 19, wherein said one or more circuits enable selection of said ones of said plurality of transmitting antennas based on said permutation matrix.

* * * * *